Figure 14:
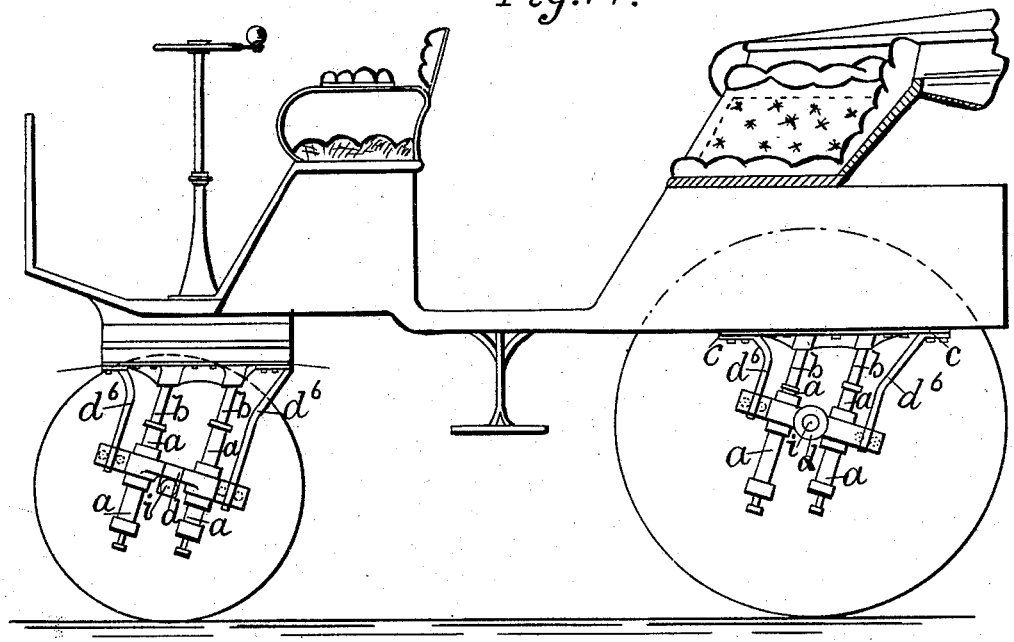

No. 638,133. Patented Nov. 28, 1899.
H. NEVILL.
WHEELED VEHICLE.
(Application filed Sept. 12, 1899.)
(No Model.) 4 Sheets—Sheet 1.
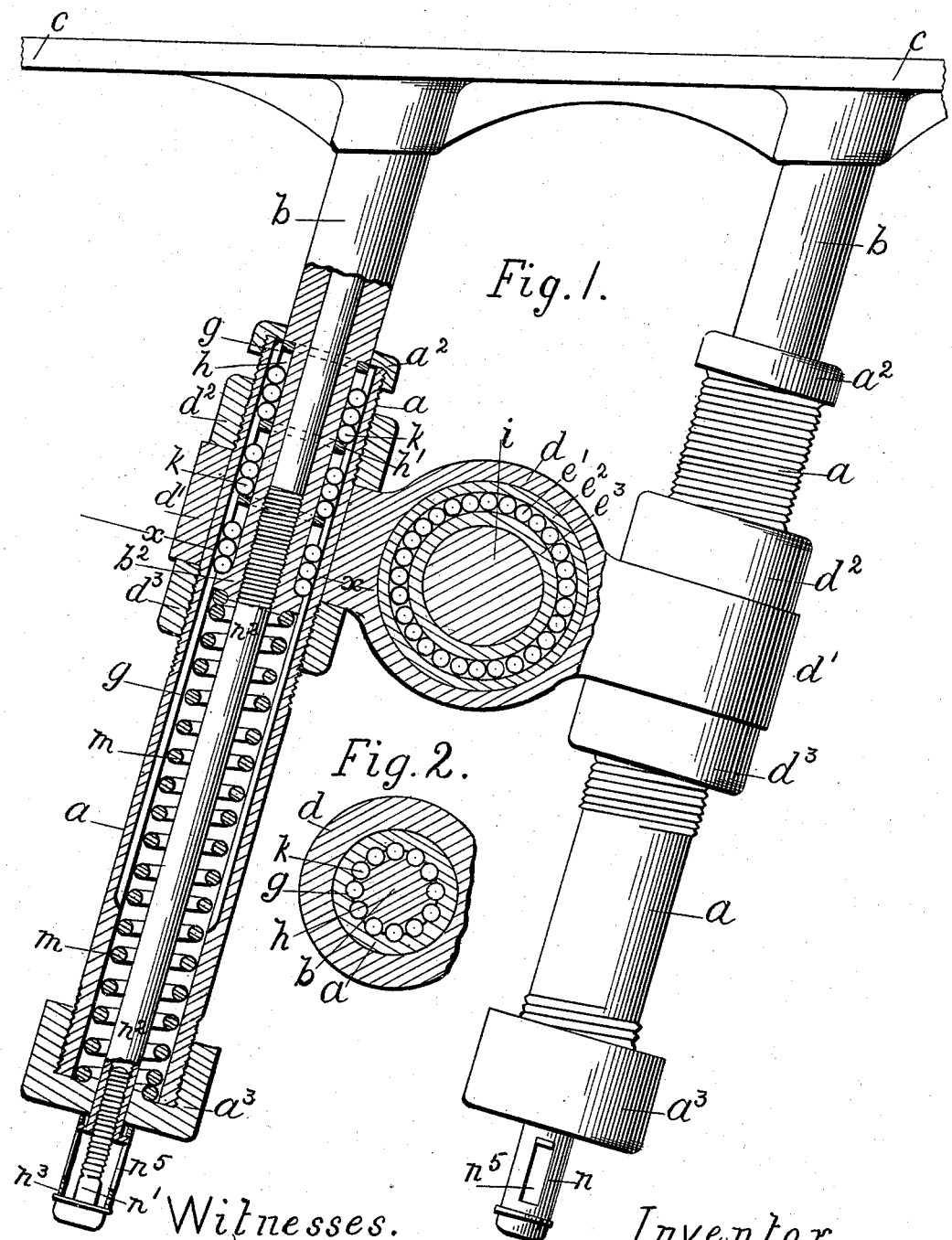
Witnesses. Inventor.

No. 638,133. Patented Nov. 28, 1899.
H. NEVILL.
WHEELED VEHICLE.
(Application filed Sept. 12, 1899.)
(No Model.) 4 Sheets—Sheet 2.
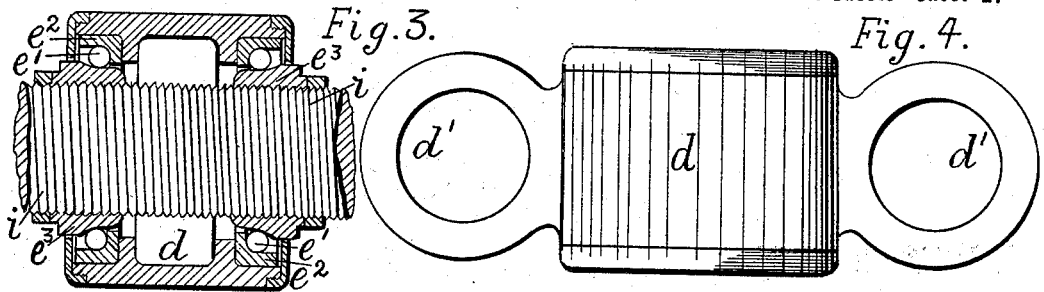
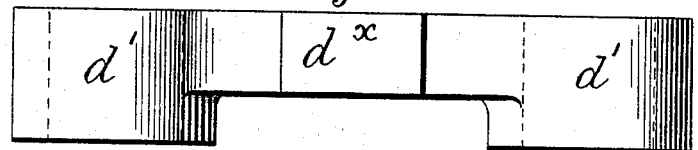
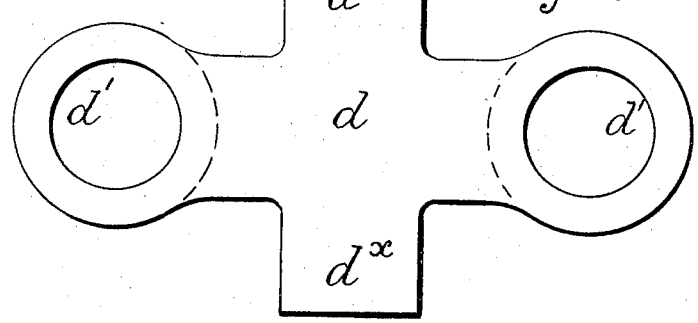
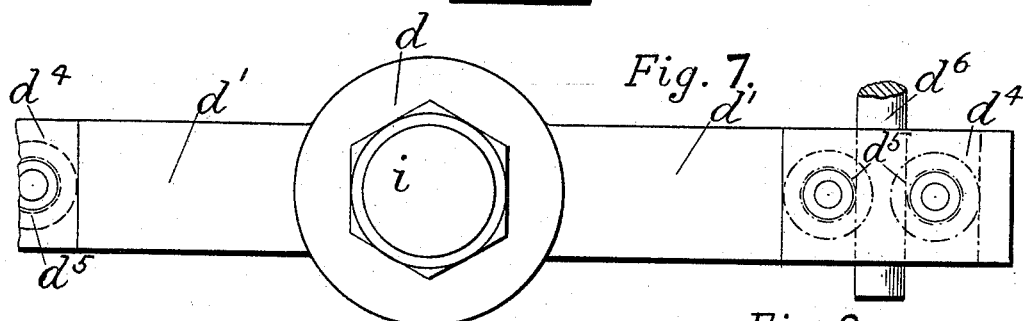
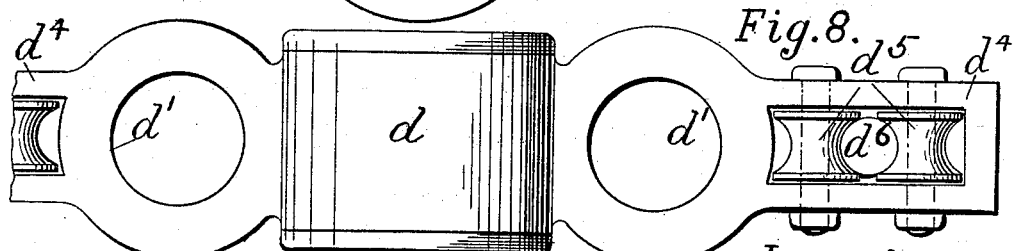
Witnesses. Inventor.

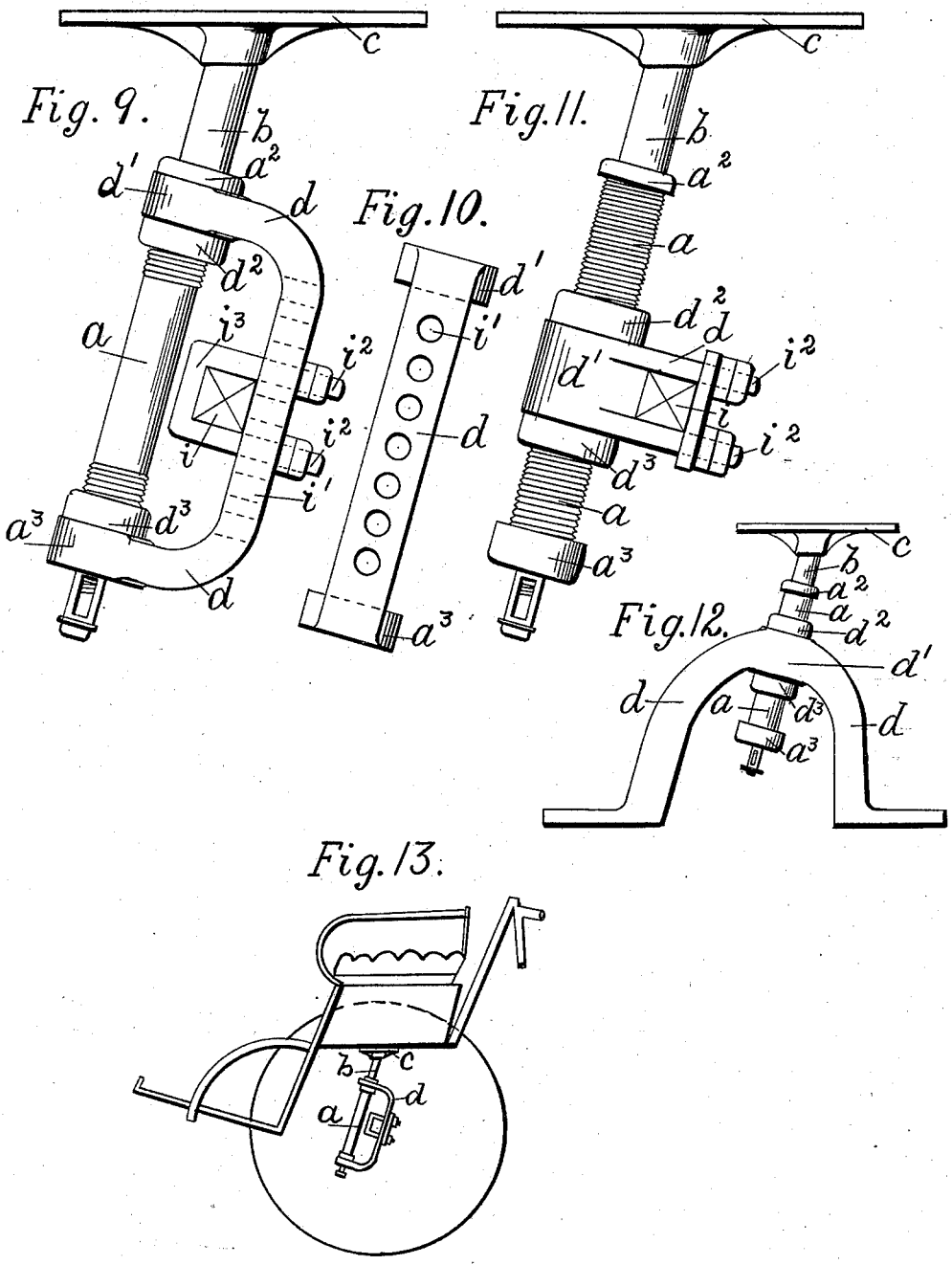

No. 638,133. Patented Nov. 28, 1899.
H. NEVILL.
WHEELED VEHICLE.
(Application filed Sept. 12, 1899.)

(No Model.) 4 Sheets—Sheet 4.

Witnesses. Inventor.

UNITED STATES PATENT OFFICE.

HENRY NEVILL, OF SOUTHAMPTON, ENGLAND.

WHEELED VEHICLE.

SPECIFICATION forming part of Letters Patent No. 638,133, dated November 28, 1899.

Application filed September 12, 1899. Serial No. 730,263. (No model.)

*To all whom it may concern:*

Be it known that I, HENRY NEVILL, manufacturing engineer, a subject of the Queen of Great Britain, residing at Aukerwyke, Shirley Warren, Southampton, England, have invented certain new and useful Improvements in Wheeled Vehicles, of which the following is a specification.

My invention relates to apparatus for cushioning the vibration that takes place between the under carriage or wheels and the body or upper frame or other part of wheeled vehicles, more particularly motor-carriages running on common roads, and has reference to apparatus in which a piston-rod acting against a spiral or coil spring contained in a cylinder is employed between the under carriage or wheel-axles and the body of the vehicle, and has for its object and consists in providing means whereby the action of the spring is rendered regular and constant and undue jumping or vibration due to friction of the parts is prevented and the weight is absolutely spring-borne and all vibration is absorbed.

In the carrying out of my invention the piston-rod or equivalent device which acts on or is acted on by the spring works in a cylinder, which I provide with longitudinal grooves on its inner surface. I also provide the outer surface of the piston or equivalent device with longitudinal grooves. These grooves form races for ball-bearings, which are formed or placed as close together as the size of the ball used and the internal surface of the cylinder will permit. The piston is given an easy fit in the cylinder, and the ball-bearings support the piston longitudinally. The coil-spring, against which the piston is adapted to bear or rest, is placed in the cylinder under the piston, and the ball-bearings provide for the piston being absolutely spring-borne and cause all vibrations between the under carriage and the body to be broken up and absorbed. The balls also serve to keep the piston from turning.

In the drawings like letters of reference indicate the same or corresponding parts.

Figure 15:
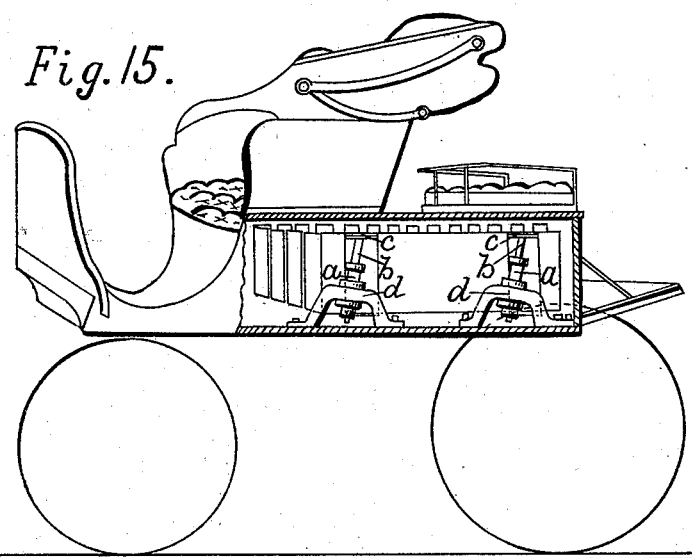

Figure 1 is a front elevation (shown partly in section) of an apparatus according to my invention in double form. Fig. 2 is a section of the piston-cylinder and ball-bearing-race arrangement, taken at the line $x$ $x$, Fig. 1. Fig. 3 is an end elevation (shown in section) of the ball-bearings to carry, in the case of motor-driven vehicles, the driven axle of the vehicle. Fig. 4 is a plan of the bearing. Fig. 5 is a side elevation, and Fig. 6 is a plan, of the bearing for the non-driven or fixed axle of the vehicle. Fig. 7 is an elevation of the axle-bearing provided with an extension at each end to receive guide-stays. The figure is shown broken off at one side. Fig. 8 is a plan of the bearing shown in Fig. 7. Fig. 9 is a side elevation of the apparatus in single form mounted in a bracket adapted to support a light carriage. Fig. 10 is an end view of the bracket shown in Fig. 9. Fig. 11 is a side elevation of a modification of the bracket shown in Fig. 9. Fig. 12 is a side elevation of the apparatus mounted in a bracket adapted to support the electric accumulator-battery of an electric motor-carriage. Fig. 13 is a side elevation of the front body of a quadricycle, illustrating the application of the apparatus shown in Figs. 9 and 10. Fig. 14 is a side elevation of a motor road-vehicle, illustrating the application of the apparatus shown in Fig. 1. Fig. 15 is a side elevation of an electric motor-carriage, illustrating the application of the apparatus shown in Fig. 12.

I attain the objects of my invention by the apparatus shown in the drawings, in which $a$ designates two vertically-inclined cylinders having closed bottoms and inclined, with their lower ends pointing toward the line of travel. These cylinders are provided with pistons $b$, moving on vertical ball-bearings and supported by springs, as hereinafter more fully described. The upper ends of the pistons $b$ are connected to a plate $c$, which is attached to and supports the body of the vehicle.

The cylinders $a$ are carried by a bracket $d$ in bosses $d'$. They are fixed and adjusted by the screw-nuts $d^2$ $d^3$. The center boss of the bracket $d$ contains the bearing for the axle $i$ of the vehicle, which consists of the balls $e'$, cup-races $e^2$, and adjustable cones $e^3$. The example illustrated in Figs. 1, 3, and 4 show a bracket and bearing suitable for the axle of the back or other driven wheels, two brackets, with their cylinders and pistons, being provided, one at each side of the vehicle, to receive the axle. In the case of the brackets $d$ of the apparatus when applied to the front axle of a vehicle or a fixed axle on which the wheel revolves I form the bracket as shown in Figs. 5 and 6 and I provide the bracket with projections or horns $d^x$, the bracket being attached to the axle by screw-clamps in the usual way.

To provide additional support to the bracket $d$, it may be provided with projections $d^4$, as shown in Figs. 7 and 8, in which are provided antifriction-rollers $d^5$, between which pass guide-stays $d^6$, which are fastened to the body of the vehicle.

The above being a general description of my improved apparatus, I will now more particularly set forth the feature of my invention by which the vibrations between the under carriage and the axle are broken up and absorbed. To this end I will describe the arrangement of vertical ball-bearings and carrying-spring of one cylinder $a$ and piston $b$, it being understood that they are all of the same construction. The cylinder $a$ is provided with grooves $g$ on its internal surface. These grooves $g$ are adapted to receive balls $k$ and are formed as close together as the size of the ball used and the internal diameter of the cylinder will permit, as shown in Fig. 2. The piston $b$ is provided with corresponding grooves $h$ and the balls $k$ are set in these grooves $h$ in tiers separated by the spring rings, stops, or studs $h'$, space being allowed between the rings for the balls $k$ to have free movement. The cylinder $a$ is provided with a screwed cover $a^2$, which keeps the balls $k$ in their place. The grooves $g$ in the cylinder $a$ are carried down the cylinder to allow for the movement of the balls $k$ and stroke of the piston $b$ as it moves up and down in the cylinder.

$m$ designates the spiral spring which is placed between the bottom $a^3$ of the cylinder $a$ and the bottom $b^2$ of the piston $b$ and by which the piston $b$, and thereby the vehicle, is supported, the eight springs of the four sets of apparatus used to support the vehicle being collectively of strength to carry the weight of the vehicle-body.

$n$ designates a device by means of which the spring $m$ can be adjusted. It consists of a bolt $n'$, which screws into a tube $n^2$, connected to the piston $b$, a distance-piece $n^3$, having a slot $n^5$, being provided between the head of the bolt $n'$ and the end of the cylinder $a$. The end of the tube $n^2$ passes through the end of the cylinder $a$ and has projections which take into the slot $n^5$. By turning the bolt $n'$ the spring $m$ can be adjusted.

With reference to Figs. 9, 10, 11, and 12 of the drawings the cushioning device is shown in single form. $a$ denotes the cylinder, and $b$ the piston, of the spring cushioning apparatus. $c$ is the flange by which the piston $b$ is attached to the body to be supported, and $d$ is the bracket which supports the cylinder $a$. The construction of the cushioning device $a\ b$ is identical with the device shown in Fig. 1.

In the apparatus shown in Fig. 9 it will be seen that the bracket $d$ is made in the form of a loop. The top $d'$ and the bottom $a^3$ receive the cylinder $a$, which is secured by the screw-nuts $a^2$, $d^3$, and $d^2$. The bottom of the boss $a^3$ is closed and forms an end to the cylinder $a$. The side of the bracket $d$ is pierced with holes $i'$, through which the screw-bolts $i^2$ of the axle-clamp $i^3$ pass and are then secured by screw-nuts $i^4$. These holes $i'$ provide for vertical adjustment.

In the example shown in Fig. 11 the bracket $d$ is a simple boss adapted to receive the cylinder $a$ and be secured to the axle $i$ by the bolts $i^2$ and nuts $i^4$.

In the example of the apparatus shown in Fig. 12 the bracket $d$ is adapted to sit on and be fastened to the bottom of the box of the body of an electric motor-carriage. Four of these cushioning devices—namely, two on each side—are used to suspend or carry the electric accumulator-battery.

The adaptation of my invention in its single form to a motor-vehicle is shown in Fig. 13, in its double form in Fig. 14, and for supporting an electric accumulator-battery in Fig. 15.

I would have it understood that the adaptations of the apparatus shown in Figs. 13, 14, and 15 are merely given as examples, as it will be evident that the placing and arrangement of the cushioning device can be varied without departing from my invention.

What I claim as my invention, and desire to secure by Letters Patent, is—

1. The combination, in an apparatus for counteracting, or cushioning vibration between the under carriage or wheels, and the body or upper frame of wheeled vehicles, of a cylinder or cylinders having ball-bearing races provided with balls, with a piston having ball-bearing races to receive the said antifriction-balls, and adapted to attach to the body of the vehicle, a coil-spring for supporting said piston, and a bracket or bearing for carrying said cylinder or cylinders and adapted to receive or attach to the wheel-axle of the vehicle all substantially as set forth.

2. In a cylinder, and piston, and coil-spring bearing for wheeled vehicles the combination of antifriction-balls placed loosely in tiers, and close together in the horizontal plane, and spring rings, stops, or studs which separate said tiers substantially as set forth.

3. A coil-spring bearing for wheeled vehicles comprising the closed cylinder or cylinders $a$ having antifriction-ball races $g$, piston or pistons $b$ having corresponding antifriction-ball races $h$, spring separating-rings $h'$, antifriction-balls $k$, the coil-spring $m$ having the adjustment device $n$, the bearing $d$ to bear the vehicle-axle $i$, and having a boss or bosses $d'$ to carry the cylinder or cylinders $a$, and the plate $c$ to attach the piston or pistons $b$ to the vehicle-body all substantially as set forth.

4. A coil-spring bearing for wheeled vehicles comprising the closed cylinders $a$ having antifriction-ball races $g$, pistons $b$ having corresponding antifriction-ball races $h$, spring separating-rings $h'$, antifriction-balls $k$, the coil-springs $m$ having the adjustment device $n$, the bearings $d$ to bear the vehicle-axle $i$, having bosses $d'$ to carry the cylinders $a$ and extensions $d^4$ provided with antifriction-rollers $d^5$, and the stays $d^6$ to steady the spring-bearing all substantially as set forth.

In testimony whereof I have hereunto set my hand in presence of two subscribing witnesses.

HENRY NEVILL.

Witnesses:
FREDERICK JOHN CHEESBROUGH,
FRANCIS CHARLES SOUTHARD.